(12) United States Patent
Jung et al.

(10) Patent No.: US 10,491,328 B2
(45) Date of Patent: Nov. 26, 2019

(54) BEAMFORMED PHYSICAL DOWNLINK CONTROL CHANNELS (BPDCCHS) FOR NARROW BEAM BASED WIRELESS COMMUNICATION

(71) Applicant: Intel IP Corporation, Santa Clara, CA (US)

(72) Inventors: Hyejung Jung, Palatine, IL (US); Alexei Davydov, Nizhny Novgorod (RU)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/753,953

(22) PCT Filed: Dec. 18, 2015

(86) PCT No.: PCT/US2015/066935
§ 371 (c)(1),
(2) Date: Feb. 20, 2018

(87) PCT Pub. No.: WO2017/039737
PCT Pub. Date: Mar. 9, 2017

(65) Prior Publication Data
US 2018/0254853 A1 Sep. 6, 2018

Related U.S. Application Data

(60) Provisional application No. 62/211,257, filed on Aug. 28, 2015.

(51) Int. Cl.
*H04L 1/00* (2006.01)
*H04L 5/00* (2006.01)
*H04W 72/04* (2009.01)

(52) U.S. Cl.
CPC .......... *H04L 1/0038* (2013.01); *H04L 5/0051* (2013.01); *H04W 72/0446* (2013.01)

(58) Field of Classification Search
CPC ............................. H04L 1/0038; H04L 5/0051
See application file for complete search history.

(56) References Cited

U.S. PATENT DOCUMENTS

2011/0075624 A1* 3/2011 Papasakellariou .... H04L 5/0053
370/329
2011/0249633 A1* 10/2011 Hong ................... H04L 5/0053
370/329

(Continued)

FOREIGN PATENT DOCUMENTS

EP       2302830 A2    3/2011
EP       2753016 A2    7/2014

(Continued)

OTHER PUBLICATIONS

3GPP TS 36.213; "3$^{rd}$ Generation Partnership Project; Technical Specification Group Radio Access Network; Evolved Universal Terrestrial Radio Access (E-UTRA); Physical Layer Procedures"; (Jun. 2015); 183 pages; V11.11.0; (Release 11).

(Continued)

*Primary Examiner* — Gary Mui
(74) *Attorney, Agent, or Firm* — Thorpe North & Western

(57) ABSTRACT

Technology for a user equipment (UE) operable to perform blind decoding for one or more beamformed physical downlink control channels (B-PDCCHs) is disclosed. The UE can receive, from one or more transmission points (TPs), one or more symbols corresponding to a downlink (DL) control region of a subframe, wherein the DL control region includes a plurality of control resource blocks (CRBs). The UE can determine a B-PDCCH search space that includes a set of candidate B-PDCCH locations. The candidate B-PDCCH locations can be included in the DL control region of (Continued)

the subframe. The UE can perform blind decoding on the candidate B-PDCCH locations included in the B-PDCCH search space in order to obtain downlink physical control information transmitted from the one or more TPs to the UE via the one or more B-PDCCHs.

12 Claims, 9 Drawing Sheets

(56) References Cited

U.S. PATENT DOCUMENTS

| | | | | |
|---|---|---|---|---|
| 2011/0274031 | A1* | 11/2011 | Gaal | H04L 5/0051 370/315 |
| 2013/0100921 | A1* | 4/2013 | Nakao | H04L 5/001 370/329 |
| 2013/0301549 | A1* | 11/2013 | Chen | H04W 4/90 370/329 |
| 2013/0301562 | A1* | 11/2013 | Liao | H04W 72/042 370/329 |
| 2014/0050159 | A1* | 2/2014 | Frenne | H04W 72/042 370/329 |
| 2014/0056279 | A1* | 2/2014 | Chen | H04W 52/04 370/330 |
| 2014/0126487 | A1* | 5/2014 | Chen | H04B 15/00 370/329 |
| 2014/0185537 | A1* | 7/2014 | Papasakellariou | H04L 5/003 370/329 |
| 2014/0348090 | A1* | 11/2014 | Nguyen | H04W 72/042 370/329 |
| 2014/0376485 | A1* | 12/2014 | Lee | H04B 7/024 370/329 |
| 2017/0048775 | A1* | 2/2017 | Kim | H04W 76/18 |

FOREIGN PATENT DOCUMENTS

| | | |
|---|---|---|
| WO | WO 2013070145 A1 | 5/2013 |
| WO | WO 2016182529 A1 | 11/2016 |
| WO | WO 2016186699 A1 | 11/2016 |

OTHER PUBLICATIONS

International Search report dated May 20, 2016, in PCT Application No. PCT/US2015/066935, filed Dec. 18, 2015; 9 pages.
International Preliminary Report on Patentability dated Mar. 6, 2018, in PCT Application No. PCT/US2015/066935, filed Dec. 18, 2015; 6 pages.

* cited by examiner

| Type | Search space $S_k^{(L)}$ | | CCE aggregation level $L$ | Number of CRB set candidates $M_1^{(L)}$ | Number of B-PDCCH candidates per CRB set $M_2^{(L)}$ | Total number of B-PDCCH candidates $M^{(L)}$ |
|---|---|---|---|---|---|---|
| | CRB set size in CRBs ($L_{CRB}$) | CRB set size in CCEs ($N_{CCE}^{(L_{CRB})}$) | | | | |
| UE-specific | 3 | 2/3/4 | 1 | 6 | 2 | 12 |
| | 6 | 4/6/8 | 2 | 5 | 2 | 10 |
| | 12 | 8/12/16 | 4 | 4 | 1 | 4 |
| | 24 | 16/24/32 | 8 | 4 | 1 | 4 |

FIG. 3

| Type | Search space $S_k^{(L)}$ | | | Number of CRB set candidates $M_1^{(L)}$ | Number of B-PDCCH candidates per CRB set $M_2^{(L)}$ | Total number of B-PDCCH candidates $M^{(L)}$ |
|---|---|---|---|---|---|---|
| | CRB set size in CRBs ($L_{CRB}$) | CRB set size in CCEs ($N_{CCE}^{(L_{CRB})}$) | CCE aggregation level $L$ | | | |
| UE-specific | 24 | 16/24/32 | 2 | 4 | 4 | 16 |
| | 24 | 16/24/32 | 4 | 4 | 2 | 8 |
| | 48 | 32/48/64 | 8 | 2 | 2 | 4 |
| | 48 | 32/48/64 | 16 | 2 | 2 | 4 |
| Common | 24 | 16/24/32 | 16 | 2 | 1 | 2 |
| | 48 | 32/48/64 | 32 | 2 | 1 | 2 |

FIG. 4

BEAMFORMED PHYSICAL DOWNLINK CONTROL CHANNELS (BPDCCHS) FOR NARROW BEAM BASED WIRELESS COMMUNICATION

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3 is a table of beamformed physical downlink control channel (B-PDCCH) candidates monitored by a user equipment (UE) for a localized control resource block (CRB) allocation in accordance with an example;

FIG. 4 is a table of beamformed physical downlink control channel (B-PDCCH) candidates monitored by a user equipment (UE) for a distributed control resource block (CRB) allocation in accordance with an example;

Figure 1:
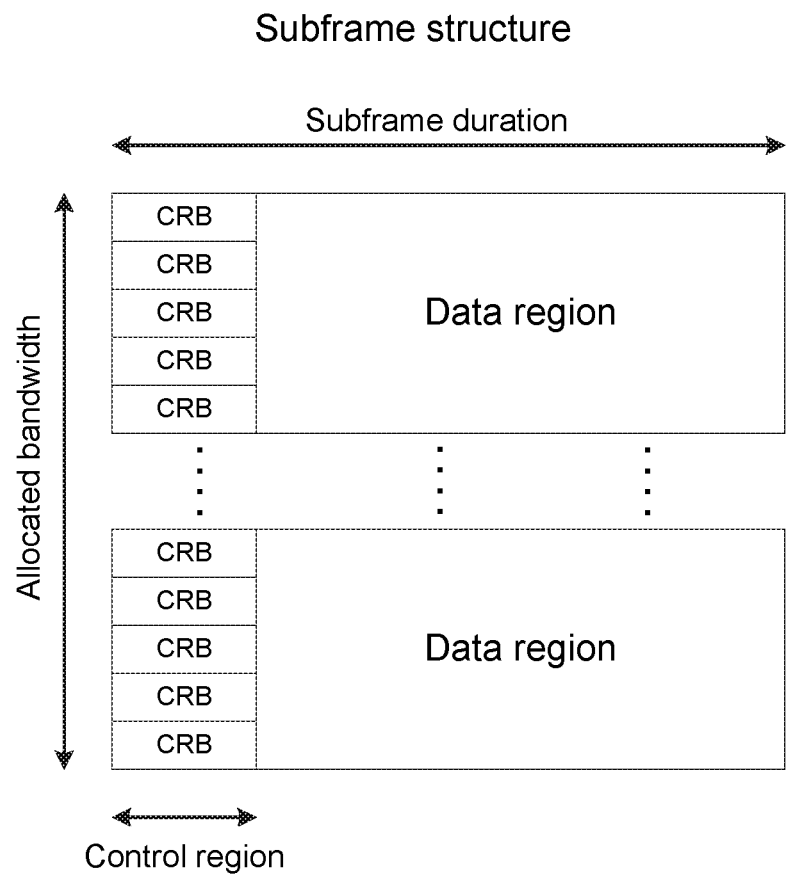
FIG. 1 illustrates a subframe structure with respect to a beamformed physical downlink control channel (B-PDCCH) in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In narrow beam based wireless communication systems, transmission points (TPs) can form beam cells, which can also be referred to as a fifth generation (5G) radio access technology (RAT) beam cells. These beam cells can operate by leveraging advanced multiple input multiple output (MIMO), or massive MIMO systems, as well as cooperative multipoint (CoMP) transmission and reception schemes. Beam cells are expected to be one of key features of 5G wireless communication systems, as the use of beam cells can increase spectral efficiency via high order multi-user MIMO. In addition, beam cells can extend cellular communication into frequency bands above 6 GHz. With respect to the overall beam cell design for 5G wireless communication systems, it is desirable for downlink physical control channels to efficiently support beamforming-centric system operation, as well as flexible multi-point transmission for a seamless user experience under conditions of mobility and channel blockage.

In 3GPP LTE and LTE-Advanced (LTE-A) systems, which correspond to Releases 9 and 10, respectively, physical layer downlink control information (DCI) can include an uplink (UL) scheduling grant, wherein the UL scheduling grant includes uplink transmit power control commands. In addition, the DCI can include downlink (DL) scheduling information, requests for aperiodic channel quality indication (CQI) reports, etc. The DCI can be carried by a physical downlink control channel (PDCCH) or an enhanced PDCCH (EPDCCH). In LTE, for the PDCCH, cell-specific reference signals (CRS) can be used for demodulation, and wideband and sector-omni (wide beam) transmissions can be employed with a single-antenna port or transmit diversity schemes. In LTE-A, DCI in the EPDCCH can be transmitted by one of semi-statically configured transmission points, which can be different from where a serving cell CRS is transmitted. In addition, the EPDCCH with localized transmission allows for frequency selective scheduling and beamforming.

In past solutions, mechanisms have been proposed to configure transmission resources for a 5G PDCCH (referred to as 'xPDCCH') and indicate xPDCCH resource configurations in order to support multiplexing of different physical layer numerologies, different applications, and/or different RATs in the same or different frequency bands. Additional past solutions have proposed the usage of analog beamformed cell-specific reference signals (AB-CRS) for demodulation of physical control information. Each AB-CRS antenna port can be mapped to one beam pattern among a set of predefined or dynamically configured eNodeB transmitter (Tx) analog beam patterns.

In the present technology, a 5G RAT beamformed PDCCH (B-PDCCH) is described. The B-PDCCH can accommodate transmission point (TP) and user equipment (UE) beamforming operations. In addition, the B-PDCCH can provide flexible multi-point downlink transmissions with low blind decoding complexity and efficient resource utilization.

In one configuration, one or more transmission points can transmit downlink physical control information intended to a specific UE or a group of UEs within a network coverage area. The downlink physical control information can include UL/DL scheduling information, hybrid automatic repeat request-acknowledgement (HARQ-ACK) feedback, etc. In one example, the one or more transmission points can transmit the downlink physical control information as a joint transmission in a B-PDCCH. In another example, each transmission point that is transmitting the downlink physical control information can be associated with a separate B-PDCCH.

In one configuration, with respect to the novel 5G RAT, control regions and data regions can be multiplexed in the time domain, thereby achieving low latency in control channel transmission and decoding. A resource unit for control channel resource allocation can be defined within the control region. The resource unit can be referred to as a control resource block (CRB). The CRB can include a predefined number of subcarriers, and a predefined, semi-statically configured, or dynamically configured number of symbols.

In one configuration, frequency division multiplexing (FDM) of multiple B-PDCCHs from the same or different transmission points can be supported by defining a CRB set. The CRB set can be a localized CRB set or a distributed CRB set. A localized CRB set can support frequency selective scheduling and beamforming of the B-PDCCH. A distributed CRB set can exploit frequency diversity, which is beneficial for a common B-PDCCH or a UE-specific B-PDCCH of a high mobility UE. In addition, the interleaving of bits, resource elements (REs), and/or resource element groups (REGs) of the B-PDCCH within the CRB set can provide time, frequency, and beam diversities for both localized and distributed CRB sets.

In one configuration, the B-PDCCH can carry a relatively small amount of information bits, e.g., approximately 40 bits for a payload size. Due to the relatively small amount of information, a single-layer beamforming scheme can be assumed in each B-PDCCH, and spatial multiplexing of multiple B-PDCCHs can be allowed to increase the control region capacity.

In one configuration, a UE-specific search space is designed such that an association of REs in the CRB with demodulation reference signal (DM RS) antenna ports can change dynamically, depending on scheduled users in a subframe, and UEs with similar beamforming weights can share the DM RS antenna port. In addition, a common search space is designed to maximally exploit the beam diversity.

In previous solutions, the 3GPP LTE PDCCH is mainly designed for the scenario in which physical control information is transmitted from one transmission point (TP), and cell-specific reference signals (CRS) are also transmitted from the same transmission point. Although the LTE-A EPDCCH can support decoupled transmission from CRS, fully flexible TP switching for control channel transmission in a dense deployment scenario is not supported, as the UE can be configured with only up to two EPDCCH-Physical Resource Block (PRB) sets. The association of each EPDCCH-PRB set with a particular TP can be semi-statically configured via higher layer signaling. Furthermore, the LTE-A EPDCCH has a longer processing delay and can restrict flexible DL and UL switching in a time division duplexing (TDD) system, as compared to the time domain multiplexing of control and data channels.

With respect to the present technology, a B-PDCCH CRB set is not configured via higher-layers, but rather is part of the B-PDCCH search space. Moreover, the association of the B-PDCCH in the CRB set with one or more TPs can be determined dynamically without semi-static quasi-co-location signaling. In addition, multiple TPs can transmit physical layer downlink control information to the UE via one or more B-PDCCHs, and the downlink control information can be transmitted in the CRB set or in multiple CRB sets of a subframe. Thus, in the present technology, the disclosed B-PDCCH design can support dynamic beam aggregation and flexible TP switching in the physical control channel. Additionally, the disclosed techniques can: support the symmetric UL/DL control channel structure based on the CRB; flexibly accommodate various beamforming strategies (both analog and hybrid beamforming) within UL/DL control regions; and exploit beamforming gains and time/frequency/beam diversities without increasing blind decoding complexity.

In one configuration, with respect to 5G RAT beam cell operations, the UE can be simultaneously served by multiple transmission points (TPs). In addition, the UE can receive downlink control information within a subframe or a transmission time interval (TTI) via one or more B-PDCCHs, and the UE can receive the downlink control information from dynamically switched multiple TPs. The techniques described herein support flexible multi-point transmission and various beamforming strategies, depending on UE and network conditions and/or a message type, in a novel 5G RAT physical downlink control channel or a LTE-A EPDCCH.

FIG. 1 illustrates an example of a subframe structure with respect to a beamformed physical downlink control channel (B-PDCCH). The subframe can be associated with a physical structure of the B-PDCCH. The subframe can include a control region and a data region, wherein the control region can include a plurality of control resource blocks (CRBs). The subframe can be associated with a duration, as well as an allocated bandwidth. In this example, the subframe duration can be the same as a transmission time interval (TTI). In view of known time division duplexing (TDD) UL/DL configuration designs, time-domain multiplexing of the data and control regions (as shown in FIG. 1) can be beneficial to achieve low latency and flexible DL/UL TDD communication.

Figure 2:
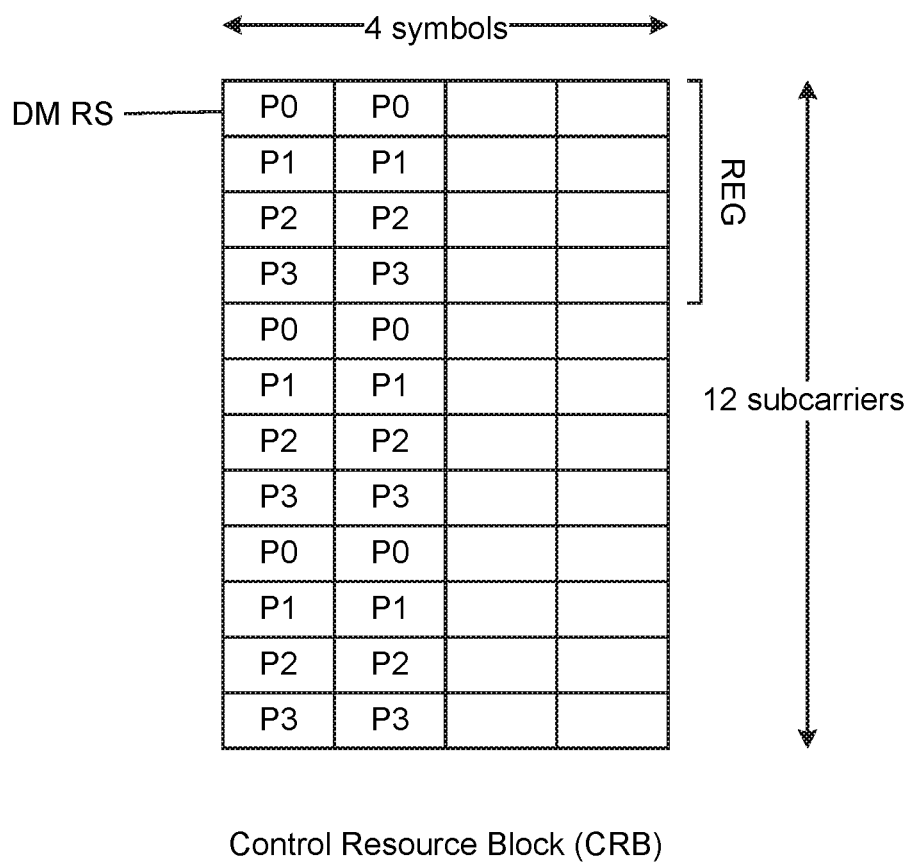
FIG. 2 illustrates a control resource block (CRB) with respect to a beamformed physical downlink control channel (B-PDCCH) in accordance with an example.

FIG. 2 illustrates an example of a control resource block (CRB) with respect to a beamformed physical downlink control channel (B-PDCCH). The CRB can be part of a control region within a subframe, wherein the subframe is associated with a physical structure of the B-PDCCH. As shown in FIG. 2, the CRB can include 4 symbols and 12 sub carriers. In one example, the number of symbols in the CRB can be the same as the number of symbols in the control region. The control region can be fixed, semi-statically configured and broadcast in a physical broadcast channel. Alternatively, the control region can be dynamically configured and signaled in a separate physical channel.

In one configuration, the B-PDCCH can be transmitted on one or more control channel elements (CCEs) within a CRB set, wherein the CRB set can include a subset of CRBs within the subframe. In one example, a CCE includes 9 resource element groups (REGs), and one REG includes 4 contiguous resource elements (REs) in the frequency domain, which is similar to the CCEs and REGs defined in LTE Release 12 and earlier. Each B-PDCCH in the CRB set can be associated with one demodulation reference signal (DM RS) antenna port of the CRB set. Furthermore, the B-PDCCH can be interleaved within the CRB set, for example, with a modulation symbol-level or REG-level interleaver to exploit time, frequency, and potentially beam diversities.

In one example, in a localized CRB allocation, the CRB set can include a set of contiguous CRBs in the frequency domain, and the UE-specific B-PDCCH and DM RS are UE-specifically beamformed. Each UE can be semi-statically configured with one antenna port from the available B-PDCCH DM RS antenna ports, and the configured DM RS antenna port can be used for blind decoding of UE-specific B-PDCCH candidates. In a given DM RS port, beamforming weights can change on a per-CRB basis. In addition, CRB bundling can be applied, during which the same beamforming weights are used for a subset of CRBs within the CRB set.

In one example, the association of DM RS antenna ports with REs can be dynamically determined, depending on scheduled users, a subframe number, and other parameters related to a UE-specific search space. For example, the DM RS in the localized CRB set is UE-specific by being scrambled with a sequence related to a UE-specific identity (UE ID). As another example, the DM RS can be scrambled by a sequence related to a DM RS antenna port, such that the DM RS can be shared by the UEs with the same configured DM RS antenna port. In addition, more than one B-PDCCH within the localized CRB set can be transmitted to a given UE.

In one example, in a distributed CRB allocation, the CRB set can include a set of equally-spaced non-contiguous CRBs in the frequency domain, and common or UE-specific B-PDCCH and DM RS can be beamformed with beams selected from a set of predefined beams. The CRB spacing in the distributed CRB allocation can be determined by the total available number of CRBs in the system and the number of CRBs in the CRB set. The employed set of predefined beams can vary over subframes and CRBs, depending on UE distribution and/or other network conditions, or based on a message type that each CRB or each subframe is carrying. For example, when a common B-PDCCH is transmitted in a distributed CRB set, the selected beams set for the distributed CRB set can cover an entire intended coverage of a cell or network. However, when only UE-specific B-PDCCHs are transmitted in the distributed CRB set, the beams set most suitable to serve the intended UEs can be selected.

In one example, the DM RS in the distributed CRB set can be scrambled by a network identity, which the UE can acquire from synchronization signals, broadcast channels, and/or other network identification signals transmitted in a TP-specific or TP cluster-specific manner. Thus, the DM RS can be used by multiple UEs which are connected or trying to establish a connection to the TP or TP cluster. In addition, the DM RS antenna ports for common B-PDCCHs can be fixed to accommodate low complexity blind decoding.

As shown in FIG. 2, the DM RS structure can support 4 orthogonal DM RS antenna ports in each CRB. To accommodate flexible multi-point transmission, there is no explicit signaling on a time and frequency synchronization reference for a given CRB set. As shown in FIG. 2, the DM RS can be repeated on two REs of the same subcarrier of two consecutive symbols, which allows residual frequency offset estimation.

In one example, the inclusion of aggregated CRBs in the CRB set can provide more accurate time and frequency offset estimates. If the UE aligns a receiver Fast Fourier Transform (FFT) window and performs frequency offset correction with respect to the time and frequency information for the strongest serving beam, frequency-domain time and frequency offset estimation and compensation can be utilized to properly receive the B-PDCCHs, which are transmitted by TPs different from the TP of the strongest serving beam. For example, if the maximum allowed frequency error at the TP is ±0.1 parts per million (ppm), the maximum frequency difference among TPs is ±0.2 ppm. In a densely deployed network where each TP has a small coverage area, the propagation time differences among selected TPs are likely to be small. Thus, DM RS based residual time and frequency offset estimation can be assumed, without the network indicating a reference TP for time and frequency synchronization.

In one configuration, a search space for the B-PDCCH can be a set of B-PDCCH candidates, which are defined to facilitate blind decoding of the B-PDCCH at the UE. The B-PDCCH search space can be designed to balance blind decoding complexity and efficient utilization of time/frequency radio resources. In one example, common B-PDCCHs intended to all the UEs within a network coverage area can be transmitted with a distributed CRB allocation, which can exploit a larger degree of frequency and beam diversities. In another example, both the distributed CRB allocation and the localized CRB allocation can be applicable to UE-specific B-PDCCHs.

In one configuration, the UE can monitor the search space for either a distributed CRB allocation or a localized CRB allocation in each subframe. For example, a set of subframes can be configured for potential transmission of common B-PDCCHs, via a fixed configuration or a semi-static higher layer signaling, and the distributed CRB allocation can be applied to both common and UE-specific B-PDCCHs on those subframes. For other subframes, only UE-specific B-PDCCHs can be transmitted with the localized CRB allocation.

In one configuration, the UE can monitor either a distributed CRB search space or a localized CRB search space for a certain period of time. For example, time and frequency radio resources, modulation, and coding can be fixed for the transmission of common control information (e.g., system information, paging), and common B-PDCCHs may not be transmitted. Each connected UE can be semi-statically configured via a higher layer signaling with either the distributed CRB allocation or the localized CRB allocation, depending on an estimated UE speed or other UE or network conditions. In an overall system perspective, the distributed CRB allocation and the localized CRB allocation can be multiplexed within a subframe, with potential overlapping CRBs.

In one configuration, the UE can monitor both distributed CRB search spaces and localized CRB search spaces in a given subframe. For example, a common B-PDCCH with a distributed CRB allocation can be transmitted in one or more subframes, and a UE-specific B-PDCCH with an either a distributed CRB allocation or a localized CRB allocation can be transmitted in one or more subframes.

FIGS. 3 and 4 are exemplary tables of beamformed physical downlink control channel (B-PDCCH) candidates monitored by a user equipment (UE) for a localized control resource block (CRB) allocation and a distributed control resource block (CRB) allocation, respectively. A B-PDCCH candidate in a search space can be determined by two components—a CRB set and a control channel element (CCE) set within the CRB set. As shown in FIGS. 3 and 4, the exemplary B-PDCCH search spaces and the number of B-PDCCH candidates for localized and distributed CRB allocations, respectively, assume an allocated bandwidth of 100 physical resource blocks (PRBs) or greater, which corresponds to 1200 subcarriers.

In one example, a minimum CRB set size can be determined together with a DM RS density within a CRB, such that the total number of DM RS instances for the minimum aggregated CRBs is large enough to provide reliable time and frequency tracking. In other words, for a given B-PDCCH, the network can arrange a transmission from the same time and frequency reference point in consecutive CRBs of at least the minimum CRB set size, e.g., 3 CRBs.

In one example, the CRB set size in terms of the CCEs can depend on a CRB set size in terms of the CRBs, a DM RS structure, and a control region size, i.e., the number of symbols for the control region. The number of CCEs of the CRB set, as shown in FIGS. 3 and 4, assume the DM RS structure (as shown in FIG. 2) and CRBs with 4, 5, or 6 symbols. In one example, with one downlink control information (DCI) format, the maximum number of blind decoding attempts is 30 for the localized CRB search space and 36 for the distributed CRB search space, respectively.

In one configuration, for the localized CRB allocation, the CRBs corresponding to the candidate CRB set $m_1$ of the search space are given by:

$$L_{CRB}\left\{\left(\left\lfloor \frac{N_{CRB} \cdot m_1}{L_{CRB} \cdot M_1^{(L)}} \right\rfloor + (Y_k + b) \bmod \left\lfloor \frac{N_{CRB}}{L_{CRB} \cdot M_1^{(L)}} \right\rfloor \right) \bmod \lfloor N_{CRB}/L_{CRB} \rfloor \right\} + i,$$

wherein $m_1=0, 1, \ldots, M_1^{(L)}-1$, $i=0, 1, \ldots, L_{CRB}-1$. In addition, $N_{CRB}$, $L_{CRB}$, and $M_1^{(L)}$ denote the number of CRBs in the allocated bandwidth, a CRB aggregation level, i.e., the number of CRBs in a CRB set, and the number of CRB set candidates, respectively. The localized CRB allocation can allow for frequency selective scheduling, as the network can select the CRB set $m_1$ based on frequency domain channel conditions. In addition, $Y_k$ represents a UE hashing function, which is dependent on a UE ID, a subframe number, and other parameters.

In one example, the UE hashing function of the LTE PDCCH can be used: $Y_k=(A \cdot Y_{k-1}) \bmod D$, wherein $Y_{-1}=n_{RNTI}\neq 0$, $A=39827$, $D=65537$ and $k=\lfloor n_s/2 \rfloor$, and $n_s$ is the slot number within a radio frame. In one example, the radio network temporary identifier (RNTI) value can be used for $n_{RNTI}$. In one example, $b=n_{CI}$ when the UE is configured with a carrier indicator field to support cross-carrier scheduling in carrier aggregation. Otherwise, $b=0$. In addition, $n_{CI}$ is the carrier indicator field value.

In one example, the CCEs corresponding to the candidate B-PDCCH $m_2$ within a localized CRB set can be given by:

$$L\left\{\left(Y_k + \left\lfloor \frac{N_{CCE}^{(L_{CRB})} \cdot m_2}{L \cdot M_2^{(L)}} \right\rfloor + b\right) \bmod \lfloor N_{CCE}^{(L_{CRB})}/L \rfloor \right\} + j,$$

wherein $m_2=0, 1, \ldots, M_2^{(L)}-1$, $j=0, 1, \ldots, L-1$. In addition, $N_{CCE}^{(L_{CRB})}$, $L$, and $M_2^{(L)}$ denote the number of total CCEs in a CRB set of size $L_{CRB}$, a CCE aggregation level, and the number of B-PDCCH candidates per CRB set, respectively. In one example, for a UE-specific B-PDCCH in a localized CRB set, a DM RS antenna port can be UE-specifically configured via higher layer signaling.

In one configuration, for the distributed CRB allocation, the CRBs corresponding to the candidate CRB set $m_1$ of the search space are given by:

$$\lfloor N_{CRB}/L_{CRB} \rfloor \cdot i + (m_1 + Y_k + b) \bmod \left\lfloor \frac{N_{CRB}}{L_{CRB}} \right\rfloor$$

wherein $m_1=0, 1, \ldots, M_1^{(L)}-1$, $i=0, 1, \ldots, L_{CRB}-1$. For the other parameters, the same definitions are applicable as compared to the parameters in the localized CRB allocation (as described earlier). In addition, the common search space, $Y_{-1}=0$.

In one example, the CCEs corresponding to the candidate B-PDCCH $m_2$ in a given distributed CRB set are:

$$L\left\{\left(Y_k + \left\lfloor \frac{N_{CCE}^{(L_{CRB})} \cdot m_2}{L \cdot M_2^{(L)}} \right\rfloor + b\right) \bmod \lfloor N_{CCE}^{(L_{CRB})}/L \rfloor \right\} + j,$$

wherein $m_2=0, 1, \ldots, M_2^{(L)}-1$, $j=0, 1, \ldots, L-1$. For the UE-specific search space, the number of B-PDCCH candidates per CRB set, $M_2^{(L)}$, as shown in the table in FIG. 4, can be selected to reduce potential collisions with the common B-PDCCH in a CRB set, while not significantly increasing the blind decoding complexity. In the distributed CRB search space, a DM RS antenna port index for a B-PDCCH can be determined by the B-PDCCH candidate index $m_2$, and other parameters. In other words, each candidate can be associated with each DM RS port.

In one example, the DM RS antenna port index for the candidate B-PDCCH $m_2$ is given by:

$(m_2+Y_k) \bmod N_{DMRS}$, wherein $Y_k$ is defined as above, and $N_{DMRS}$ is a number of DM RS antenna ports within a CRB. For example, if $M_2^{(L)}=1$ and $Y_{-1}=0$ for a common B-PDCCH, the DM RS antenna port 0 can be used for demodulation of the common B-PDCCH.

In one configuration, a user equipment can receive, from one or more transmission points (TPs), one or more symbols corresponding to a downlink (DL) control region of a subframe, wherein the DL control region comprises a plurality of control resource blocks (CRBs). The UE can determine a beamformed physical downlink control channel (B-PDCCH) search space, wherein the B-PDCCH search space is a set of B-PDCCH candidate locations. The UE can perform a time and frequency offset estimation and compensation, as well as channel estimation, based on one or more demodulation reference signals (DMRS) received in the plurality of CRBs in the DL control region of the subframe. The UE can perform blind decoding of the one or more B-PDCCHs candidate locations based on the determined B-PDCCH search space. In addition, downlink control information (DCI) for each of the one or more B-PDCCHs can be transmitted using one or more control channel elements (CCEs) within a CRB set, wherein the CRB set comprises a subset of CRBs from the plurality of CRBs in the subframe.

In one configuration, each of the plurality of CRBs can include a predefined number of subcarriers and a predefined, semi-statically configured, or dynamically configured number of symbols.

In one configuration, the B-PDCCH search space includes one or more CRB sets, and one or more CCE sets within each of the one or more CRB sets.

In one configuration, the CRB set can include a localized CRB set and a distributed CRB set, wherein the localized CRB set is a set of contiguous CRBs in the frequency domain, and the distributed CRB set is a set of equally-spaced non-contiguous CRBs in the frequency domain.

In one configuration, a UE-specific B-PDCCH can be transmitted in the localized CRB set or the distributed CRB set. In other words, downlink control information can be transmitted using the localized CRB set or the distributed CRB set via the UE-specific B-PDCCH.

In one configuration, a common B-PDCCH can be transmitted in the distributed CRB set. In other words, downlink control information can be transmitted using the distributed CRB set via the common B-PDCCH.

In one configuration, the one or more B-PDCCHs and the demodulation reference signal (DMRS) in the localized CRB set can be UE-specifically beamformed.

In one configuration, the one or more B-PDCCHs and the demodulation reference signal (DMRS) in the distributed CRB set can be beamformed with beams selected from a set of predefined beams.

In one configuration, the B-PDCCH search space includes one or more distributed CRB sets or one or more localized CRB sets, and the distributed and localized CRB sets can change in every subframe, or the distributed and localized CRB sets can be the same for a certain time period (e.g., multiple subframes can include the same localized CRB sets or distributed CRB sets).

In one configuration, the B-PDCCH search space includes one or more distributed CRB sets and one or more localized CRB sets.

In one configuration, downlink control information can be transmitted via the one or more B-PDCCHs with a single-layer beamforming scheme, and each of the one or more B-PDCCHs can be associated with one DM RS antenna port.

In one configuration, the blind decoding performed at the UE can include the deinterleaving of bits, resource elements (REs), and/or resource element groups (REGs) of each of the one or more B-PDCCHs within the CRB set.

In one configuration, the UE can be configured with a demodulation reference signal (DMRS) antenna port index via higher layer signaling.

In one configuration, a demodulation reference signal (DMRS) antenna port index for each of the one or more B-PDCCHs can be based on a B-PDCCH candidate index within the CRB set.

Figure 5:
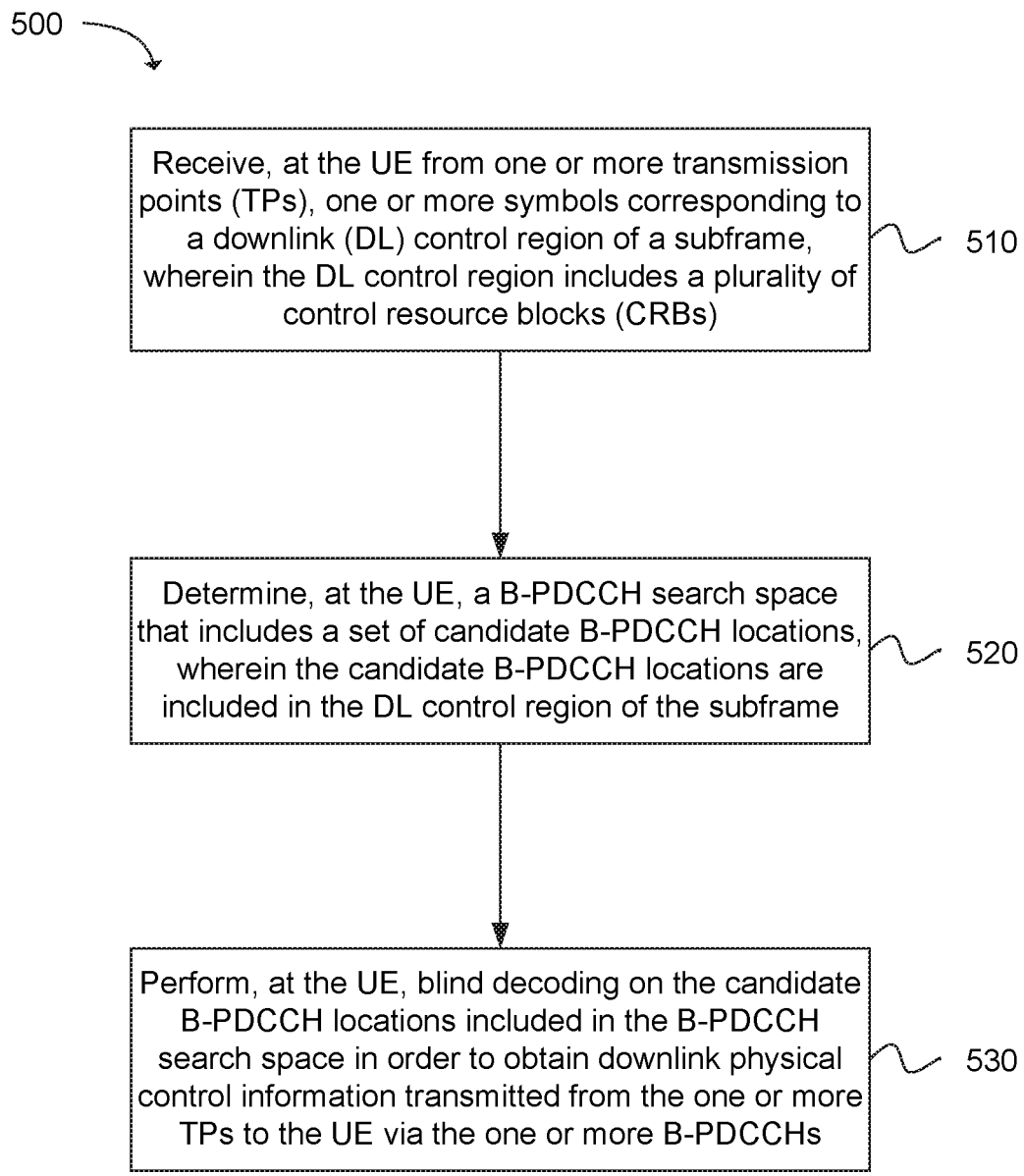
FIG. 5 depicts functionality of a user equipment (UE) operable to perform blind decoding for one or more beamformed physical downlink control channels (B-PDCCHs) in accordance with an example.

Another example provides functionality 500 of a user equipment (UE) operable to perform blind decoding for one or more beamformed physical downlink control channels (B-PDCCHs), as shown in the flow chart in FIG. 5. The UE can comprise one or more processors and memory configured to: receive, at the UE from one or more transmission points (TPs), one or more symbols corresponding to a downlink (DL) control region of a subframe, wherein the DL control region includes a plurality of control resource blocks (CRBs), as in block 510. The UE can comprise one or more processors and memory configured to: determine, at the UE, a B-PDCCH search space that includes a set of candidate B-PDCCH locations, wherein the candidate B-PDCCH locations are included in the DL control region of the subframe, as in block 520. The UE can comprise one or more processors and memory configured to: perform, at the UE, blind decoding on the candidate B-PDCCH locations included in the B-PDCCH search space in order to obtain downlink physical control information transmitted from the one or more TPs to the UE via the one or more B-PDCCHs, as in block 530.

Figure 6:
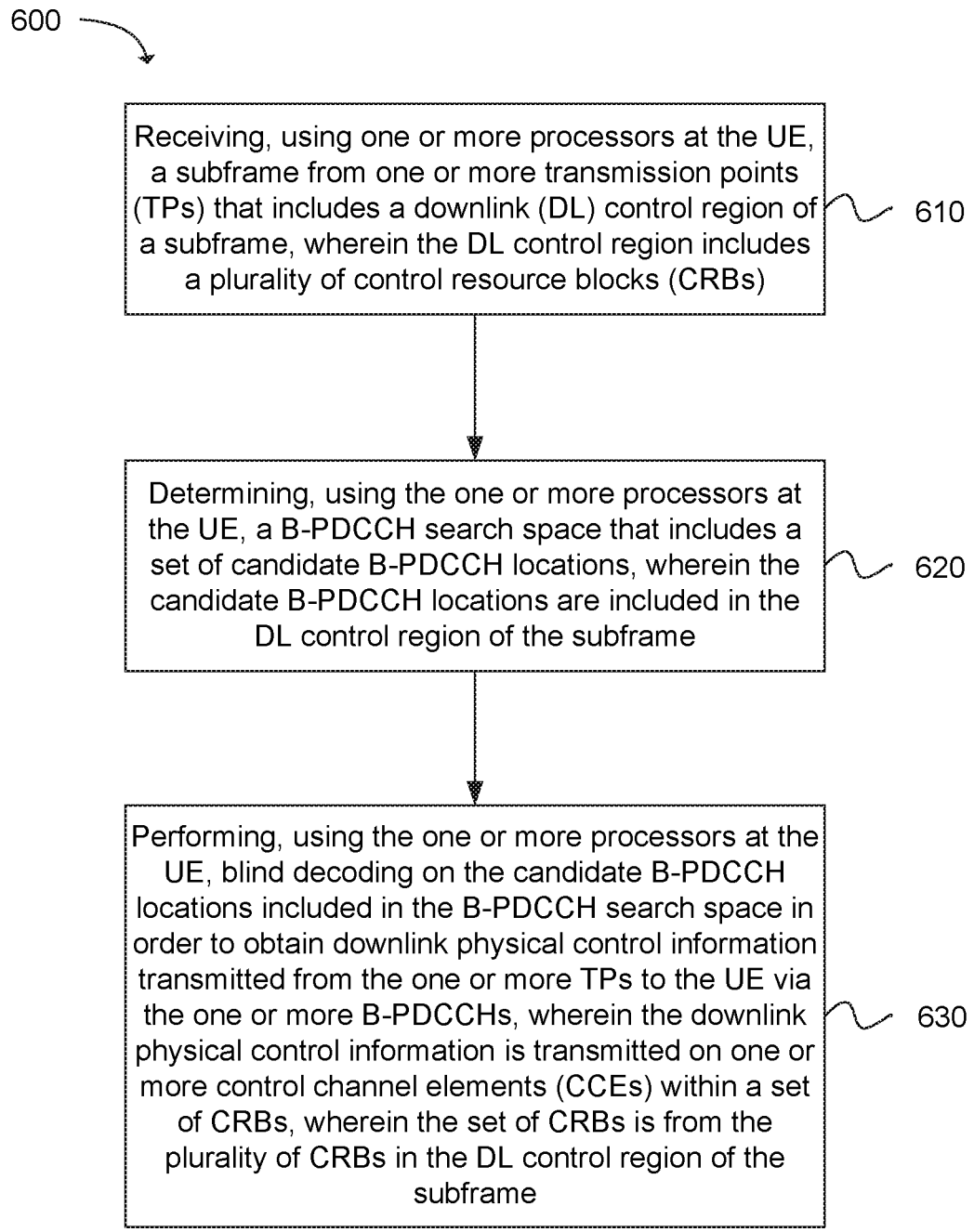
FIG. 6 depicts a flowchart of a machine readable storage medium having instructions embodied thereon for performing blind decoding at a user equipment (UE) in accordance with an example.

Another example provides at least one machine readable storage medium having instructions 600 embodied thereon for performing blind decoding at a user equipment (UE), as shown in the flow chart in FIG. 6. The instructions can be executed on a machine, where the instructions are included on at least one computer readable medium or one non-transitory machine readable storage medium. The instructions when executed perform: receiving, using one or more processors at the UE, a subframe from one or more transmission points (TPs) that includes a downlink (DL) control region of a subframe, wherein the DL control region includes a plurality of control resource blocks (CRBs), as in block 610. The instructions when executed perform: determining, using the one or more processors at the UE, a B-PDCCH search space that includes a set of candidate B-PDCCH locations, wherein the candidate B-PDCCH locations are included in the DL control region of the subframe, as in block 620. The instructions when executed perform: performing, using the one or more processors at the UE, blind decoding on the candidate B-PDCCH locations included in the B-PDCCH search space in order to obtain downlink physical control information transmitted from the one or more TPs to the UE via the one or more B-PDCCHs, wherein the downlink physical control information is transmitted on one or more control channel elements (CCEs) within a set of CRBs, wherein the set of CRBs is from the plurality of CRBs in the DL control region of the subframe, as in block 630.

Figure 7:
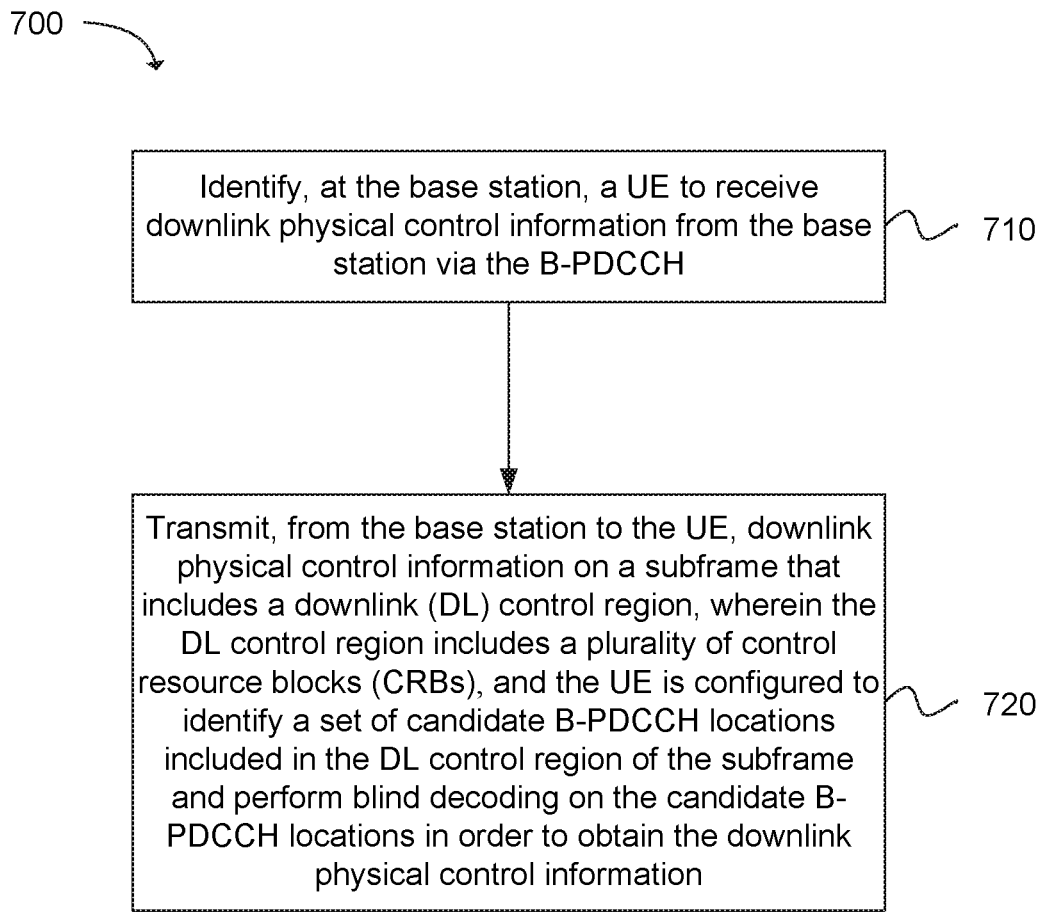
FIG. 7 depicts functionality of a base station operable to transmit downlink physical control information to user equipments (UEs) via a beamformed physical downlink control channel (B-PDCCH) in accordance with an example.

Another example provides functionality 700 of a base station operable to transmit downlink physical control information to user equipments (UEs) via a beamformed physical downlink control channel (B-PDCCH), as shown in the flow chart in FIG. 7. The base station can comprise one or more processors and memory configured to: identify, at the base station, a UE to receive downlink physical control information from the base station via the B-PDCCH, as in block 710. The base station can comprise one or more processors and memory configured to: transmit, from the base station to the UE, downlink physical control information on a subframe that includes a downlink (DL) control region, wherein the DL control region includes a plurality of control resource blocks (CRBs), and the UE is configured to identify a set of candidate B-PDCCH locations included in the DL control region of the subframe and perform blind decoding on the candidate B-PDCCH locations in order to obtain the downlink physical control information, as in block 720.

Figure 8:
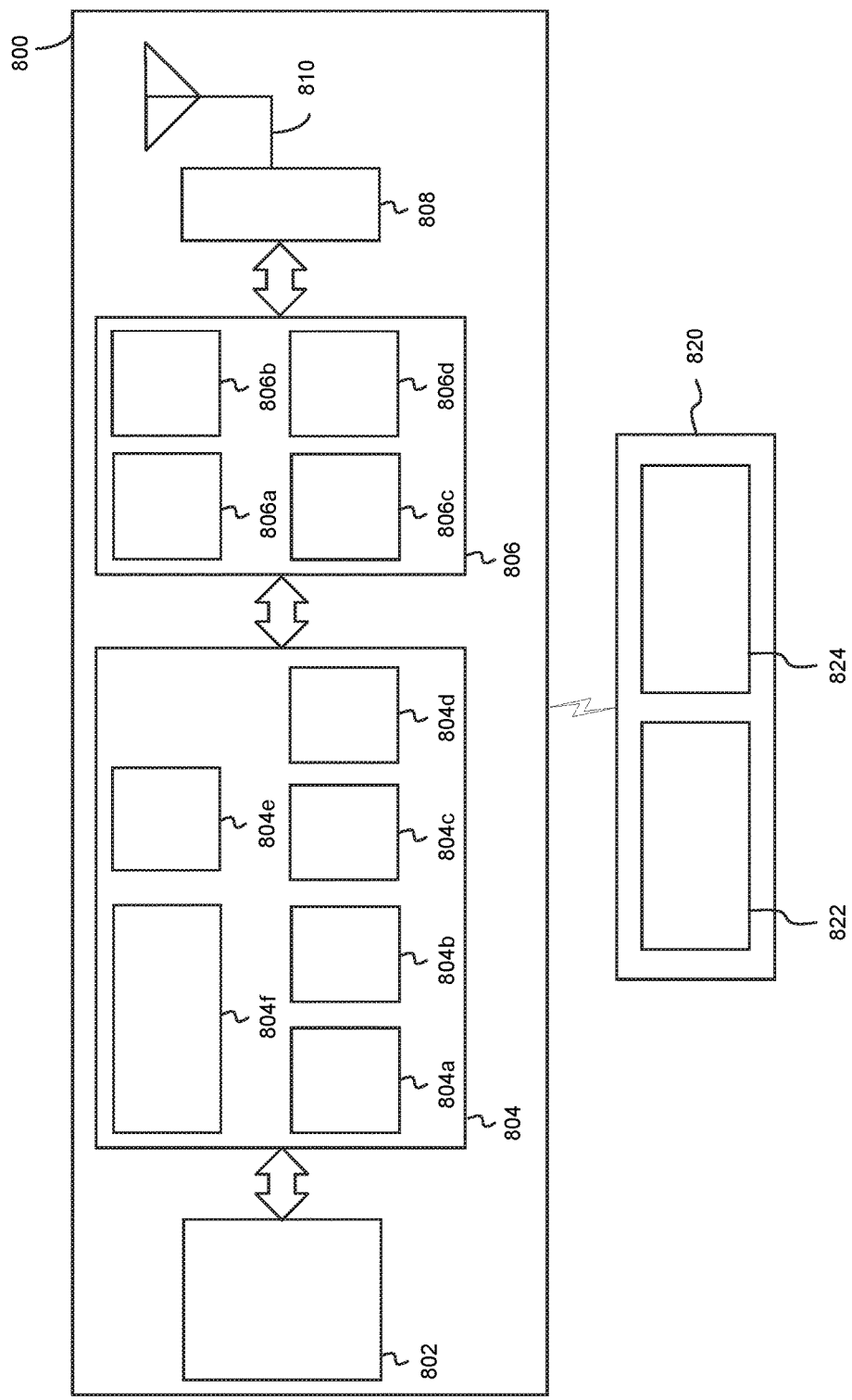
FIG. 8 illustrates a diagram of a wireless device (e.g., UE) in accordance with an example.

FIG. 8 provides an example illustration of a user equipment (UE) device 800, such as a wireless device, a mobile station (MS), a mobile wireless device, a mobile communication device, a tablet, a handset, or other type of wireless device. The UE device 800 can include one or more antennas configured to communicate with a node 820 or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The node 820 can include one or more processors 822 and memory 824. The UE device 800 can be configured to communicate using at least one wireless communication standard including 3GPP LTE, WiMAX, High Speed Packet Access (HSPA), Bluetooth, and WiFi. The UE device 800 can communicate using separate antennas for each wireless communication standard or shared antennas for multiple wireless communication standards. The UE device 800 can communicate in a wireless local area network (WLAN), a wireless personal area network (WPAN), and/or a WWAN.

In some embodiments, the UE device 800 may include application circuitry 802, baseband circuitry 804, Radio Frequency (RF) circuitry 806, front-end module (FEM) circuitry 808 and one or more antennas 810, coupled together at least as shown.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium, and may be configured to execute instructions stored in the storage medium to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a second generation (2G) baseband processor 804a, third generation (3G) baseband processor 804b, fourth generation (4G) baseband processor 804c, and/or other baseband processor(s) 804d for other existing generations, generations in development or to be developed in the future (e.g., fifth generation (5G), 6G, etc.). The baseband circuitry 804 (e.g., one or more of baseband processors 804a-d) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f. The audio DSP(s) 804f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

The RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b and filter circuitry 806c. The transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c. The filter circuitry 806c may include a low-pass filter (LPF), although the scope of the embodiments is not limited in this respect.

In some embodiments, the mixer circuitry 806a of the receive signal path and the mixer circuitry 806a of the transmit signal path may include two or more mixers and may be arranged for quadrature down-conversion and/or up-conversion respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct down-conversion and/or direct up-conversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810.

Figure 9:
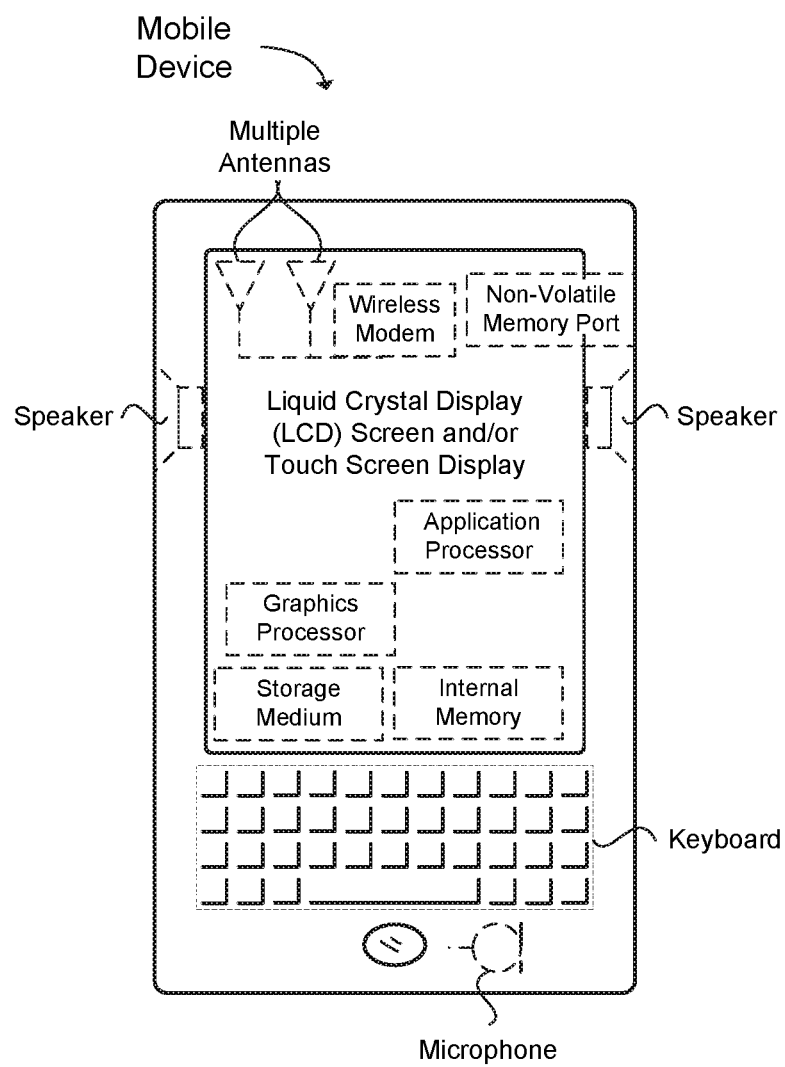
FIG. 9 illustrates a diagram of a wireless device (e.g., UE) in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor).

The wireless modem can, in one example, modulate signals that the wireless device transmits via the one or more antennas and demodulate signals that the wireless device receives via the one or more antennas.

FIG. 9 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to perform blind decoding for one or more beamformed physical downlink control channels (B-PDCCHs), the apparatus comprising one or more processors and memory configured to:
receive, at the UE from one or more transmission points (TPs), one or more symbols corresponding to a downlink (DL) control region of a subframe, wherein the DL control region includes a plurality of control resource blocks (CRBs); determine, at the UE, a B-PDCCH search space that includes a set of candidate B-PDCCH locations, wherein the candidate B-PDCCH locations are included in the DL control region of the subframe; and perform, at the UE, blind decoding on the candidate B-PDCCH locations included in the B-PDCCH search space in order to obtain downlink physical control information transmitted from the one or more TPs to the UE via the one or more B-PDCCHs.

Example 2 includes the apparatus of Example 1, wherein the downlink physical control information is transmitted on one or more control channel elements (CCEs) within a set of CRBs, wherein the set of CRBs is from the plurality of CRBs in the DL control region of the subframe.

Example 3 includes the apparatus of any of Examples 1-2, further configured to perform at least one of: time and frequency offset estimation and channel estimation based on one or more demodulation reference signals (DMRS) received in the plurality of CRBs in the DL control region of the subframe.

Example 4 includes the apparatus of any of Examples 1-3, wherein each of the plurality of CRBs in the DL control region of the subframe includes: a predefined number of subcarriers; and a predefined, semi-statically configured or dynamically configured number of symbols.

Example 5 includes the apparatus of any of Examples 1-4, wherein the B-PDCCH search space includes one or more sets of CRBs, wherein each of the one or more sets of CRBs include one or more CCE sets.

Example 6 includes the apparatus of any of Examples 1-5, wherein the set of CRBs includes at least one of a localized CRB set and a distributed CRB set, wherein the localized CRB set is a set of contiguous CRBs in a frequency domain and the distributed CRB set is a set of equally-spaced non-contiguous CRBs in the frequency domain.

Example 7 includes the apparatus of any of Examples 1-6, wherein one of the localized CRB set or the distributed CRB set is associated with a UE-specific B-PDCCH.

Example 8 includes the apparatus of any of Examples 1-7, wherein the distributed CRB set is associated with a common B-PDCCH.

Example 9 includes the apparatus of any of Examples 1-8, wherein the one or more B-PDCCHs and one or more demodulation reference signals (DMRS) are UE-specifically beamformed with respect to the localized CRB set.

Example 10 includes the apparatus of any of Examples 1-9, wherein the one or more B-PDCCHs and one or more demodulation reference signals (DMRS) with respect to the distributed CRB set are beamformed with beams selected from a predefined set of beams.

Example 11 includes the apparatus of any of Examples 1-10, wherein the B-PDCCH search space includes one or more distributed CRB sets or one or more localized CRB sets, wherein: a defined time period includes the one or more distributed CRB sets or the one or more localized CRB sets, wherein the defined time period includes one subframe.

Example 12 includes the apparatus of any of Examples 1-11, wherein the B-PDCCH search space includes one or more distributed CRB sets and one or more localized CRB sets.

Example 13 includes the apparatus of any of Examples 1-12, wherein the one or more B-PDCCHs are associated with a single-layer beamforming scheme, wherein the one or more B-PDCCHs are each associated with a demodulation reference signal (DMRS) antenna port.

Example 14 includes the apparatus of any of Examples 1-13, wherein the blind decoding on the candidate B-PDCCH locations includes at least one of: a deinterleaving of bits, resource elements (REs) and resource element groups (REGs) within the set of CRBs for each of the one or more B-PDCCHs.

Example 15 includes the apparatus of any of Examples 1-14, wherein: the UE is configured with a demodulation reference signal (DMRS) antenna port index via higher layer signaling; or a demodulation reference signal (DMRS) antenna port index for each of the one or more B-PDCCHs is based on a B-PDCCH candidate index within the set of CRBs.

Example 16 includes at least one machine readable storage medium having instructions embodied thereon for performing blind decoding at a user equipment (UE), the instructions when executed perform the following: receiving, using one or more processors at the UE, a subframe from one or more transmission points (TPs) that includes a downlink (DL) control region of a subframe, wherein the DL control region includes a plurality of control resource blocks (CRBs); determining, using the one or more processors at the UE, a B-PDCCH search space that includes a set of candidate B-PDCCH locations, wherein the candidate B-PDCCH locations are included in the DL control region of the subframe; and performing, using the one or more processors at the UE, blind decoding on the candidate B-PDCCH locations included in the B-PDCCH search space in order to obtain downlink physical control information transmitted from the one or more TPs to the UE via the one or more B-PDCCHs, wherein the downlink physical control information is transmitted on one or more control channel elements (CCEs) within a set of CRBs, wherein the set of CRBs is from the plurality of CRBs in the DL control region of the subframe.

Example 17 includes the at least one machine readable storage medium of Example 16, further comprising instructions when executed using the at least one processor at the UE perform the following: performing at least one of: time and frequency offset estimation and channel estimation based on one or more demodulation reference signals (DMRS) received in the plurality of CRBs in the DL control region of the subframe.

Example 18 includes the at least one machine readable storage medium of any of Examples 16-17, wherein the set of CRBs includes at least one of a localized CRB set and a distributed CRB set, wherein the localized CRB set is a set of contiguous CRBs in a frequency domain and the distributed CRB set is a set of equally-spaced non-contiguous CRBs in the frequency domain.

Example 19 includes the at least one machine readable storage medium of any of Examples 16-18, wherein: one of the localized CRB set or the distributed CRB set is associated with a UE-specific B-PDCCH; or the distributed CRB set is associated with a common B-PDCCH.

Example 20 includes the at least one machine readable storage medium of any of Examples 16-19, wherein: the one or more B-PDCCHs and one or more demodulation reference signals (DMRS) are UE-specifically beamformed with respect to the localized CRB set; or the one or more B-PDCCHs and one or more DMRS with respect to the distributed CRB set are beamformed with beams selected from a predefined set of beams.

Example 21 includes the at least one machine readable storage medium of any of Examples 16-20, further comprising instructions when executed using the at least one processor at the UE perform the following: performing blind decoding on the candidate B-PDCCH locations by deinterleaving at least one of: bits, resource elements (REs) and resource element groups (REGs) within the set of CRBs for each of the one or more B-PDCCHs.

Example 22 includes an apparatus of a base station operable to transmit downlink physical control information to user equipments (UEs) via a beamformed physical downlink control channel (B-PDCCH), the apparatus comprising one or more processors and memory configured to: identify, at the base station, a UE to receive downlink physical control information from the base station via the B-PDCCH; and transmit, from the base station to the UE, downlink physical control information on a subframe that includes a downlink (DL) control region, wherein the DL control region includes a plurality of control resource blocks (CRBs), and the UE is configured to identify a set of candidate B-PDCCH locations included in the DL control region of the subframe and perform blind decoding on the candidate B-PDCCH locations in order to obtain the downlink physical control information.

Example 23 includes the apparatus of Example 22, wherein the base station is configured to form a narrow beam cell that utilizes a frequency band above 6 gigahertz (GHz).

Example 24 includes the apparatus of any of Examples 22-23, wherein the set of candidate B-PDCCH locations are included in a B-PDCCH search space, wherein the B-PDCCH search space includes one or more distributed CRB sets or one or more localized CRB sets.

Example 25 includes the apparatus of any of Examples 22-24, wherein the downlink physical control information is transmitted from the eNodeB to the UE on one or more control channel elements (CCEs) within a set of CRBs, wherein the set of CRBs is included in the DL control region of the subframe.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable to perform blind decoding for one or more beamformed physical downlink control channels (B-PDCCHs), the apparatus comprising one or more processors and memory configured to:
receive, at the UE form one or more transmission points (TPs), one or more symbols corresponding to a downlink (DL) control region of a subframe, wherein the DL control region includes a plurality of control resource blocks (CRBs);
determine, at the UE, a B-PDCCH search space that includes a set of candidate B-PDCCH locations, wherein the candidate B-PDCCH locations are included in the DL control region of the subframe; and
perform, at the UE, blind decoding on the candidate B-PDCCH locations included in the B-PDCCH search space in order to obtain downlink physical control information transmitted form the one or more TPs to the UE via the one or more B-PDCCHs;
wherein the downlink physical control information is transmitted on one or more control channel elements (CCEs) within a set of CRBs, wherein the set of CRBs is form the plurality of CRBs in the DL control region of the subframe;
wherein the set of CRBs includes at least one of a localized CRB set and a distributed CRB set, wherein the localized CRB set is a set of contiguous CRBs in a frequency domain and the distributed CRB set is a set of equally-spaced non-contiguous CRBs in the frequency domain; and
wherein:
the distributed CRB set is associated with a common B-PDCCH, or
the one or more B-PDCCHs, and one or more demodulation reference signals (DMRS) are UE-specifically beamformed with respect to the localized CRB set; or
the one or more B-PDCCHs and one or more demodulation reference signals (DMRS) with respect to the distributed CRB set are beamformed with beams selected form a predefined set of beams, or
the B-PDCCH search space includes one or more distributed CRB sets or one or more localized CRB sets, wherein:
a defined time period includes the one or more distributed CRB sets or the one or more localized CRB sets, wherein the defined time period includes one subframe; or
the one or more B-PDCCHs are associated with a signal-layer beamformed scheme, wherein the one or more B-PDCCHs are each associated with a demodulation reference signal (DMRS) antenna port.

2. The apparatus of claim 1, further configured to perform at least one of: time and frequency offset estimation and channel estimation based on one or more demodulation reference signals (DMRS) received in the plurality of CRBs in the DL control region of the subframe.

3. The apparatus of claim 1, wherein each of the plurality of CRBs in the DL control region of the subframe includes:
a predefined number of subcarriers; and
a predefined, semi-statically configured or dynamically configured number of symbols.

4. The apparatus of claim 1, wherein the B-PDCCH search space includes one or more sets of CRBs, wherein each of the one or more sets of CRBs include one or more CCE sets.

5. The apparatus of claim 1, wherein one of the localized CRB set or the distributed CRB set is associated with a UE-specific B-PDCCH.

6. The apparatus of claim 1, wherein the B-PDCCH search space includes one or more distributed CRB sets and one or more localized CRB sets.

7. The apparatus of claim 1, wherein the blind decoding on the candidate B-PDCCH locations includes at least one of: a deinterleaving of bits, resource elements (REs) and resource element groups (REGs) within the set of CRBs for each of the one or more B-PDCCHs.

8. The apparatus of claim 1, wherein:
the UE is configured with a demodulation reference signal (DMRS) antenna port index via higher layer signaling; or
a demodulation reference signal (DMRS) antenna port index for each of the one or more B-PDCCHs is based on a B-PDCCH candidate index within the set of CRBs.

9. At least one non-transitory machine readable storage medium having instructions embodied thereon for performing blind decoding at a user equipment (UE), the instructions when executed perform the following:
receiving, using one or more processors at the UE, a subframe from one or more transmission points (TPs) that includes a downlink (DL) control region of a subframe, wherein the DL control region includes a plurality of control resource blocks (CRBs);
determining, using the one or more processors at the UE, a B-PDCCH search space that includes a set of candidate B-PDCCH locations, wherein the candidate B-PDCCH locations are included in the DL control region of the subframe; and
performing, using the one or more processors at the UE, blind decoding on the candidate B-PDCCH locations included in the B-PDCCH search space in order to obtain downlink physical control information transmitted from the one or more TPs to the UE via the one or more B-PDCCHs, wherein the downlink physical control information is transmitted on one or more control channel elements (CCEs) within a set of CRBs, wherein the set of CRBs is from the plurality of CRBs in the DL control region of the subframe
wherein the set of CRBs includes at least one of a localized CRB set and a distributed CRB set, wherein the localized CRB set is a set of contiguous CRBs in a frequency domain and the distributed CRB set is a set of equally-spaced non-contiguous CRBs in the frequency domain;
wherein:
the one or more B-PDCCHs and one or more demodulation reference signals (DMRS) are UE-specifically beamformed with respect to the localized CRB set; or
the one or more B-PDCCHs and one or more DMRS with respect to the distributed CRB set are beamformed with beams selected form a predefined set of beams.

10. The at least one non-transitory machine readable storage medium of claim 9, further comprising instructions when executed using the at least one processor at the UE perform the following: performing at least one of: time and frequency offset estimation and channel estimation based on one or more demodulation reference signals (DMRS) received in the plurality of CRBs in the DL control region of the subframe.

11. The at least one non-transitory machine readable storage medium of claim 9, wherein:
one of the localized CRB set or the distributed CRB set is associated with a UE-specific B-PDCCH; or
the distributed CRB set is associated with a common B-PDCCH.

12. The at least one non-transitory machine readable storage medium of claim 9, further comprising instructions when executed using the at least one processor at the UE perform the following: performing blind decoding on the candidate B-PDCCH locations by deinterleaving at least one of: bits, resource elements (REs) and resource element groups (REGs) within the set of CRBs for each of the one or more B-PDCCHs.

* * * * *